US012506512B2

(12) United States Patent
Mankowski et al.

(10) Patent No.: US 12,506,512 B2
(45) Date of Patent: Dec. 23, 2025

(54) ELECTRIC VEHICLE NOISE SNIFFER AND METHODS OF MITIGATING PACKET FLOW INTERRUPTIONS BY NOISE CANCELLATION AND AVOIDANCE OF NOISE REGION ENVELOPES

(71) Applicant: ACCELERATED SYSTEMS INC., Waterloo (CA)

(72) Inventors: Peter Mankowski, Cambridge (CA); Willem Jager, Cambridge (CA); Andrei Buin, Waterloo (CA); Lucas Malta Valle Coelho, Kitchener (CA); Daniel Hailu, Waterloo (CA); Muhammad Ikhlas, Waterloo (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 21 days.

(21) Appl. No.: 18/289,463

(22) PCT Filed: May 4, 2022

(86) PCT No.: PCT/IB2022/054125
§ 371 (c)(1),
(2) Date: Nov. 3, 2023

(87) PCT Pub. No.: WO2022/234482
PCT Pub. Date: Nov. 10, 2022

(65) Prior Publication Data
US 2024/0243774 A1 Jul. 18, 2024

Related U.S. Application Data

(60) Provisional application No. 63/221,239, filed on Jul. 13, 2021, provisional application No. 63/184,090, filed on May 4, 2021.

(51) Int. Cl.
*H04B 3/54* (2006.01)
*B60R 16/023* (2006.01)
(Continued)

(52) U.S. Cl.
CPC ............. *H04B 3/54* (2013.01); *B60R 16/023* (2013.01); *B60R 16/03* (2013.01); *G01R 29/26* (2013.01);
(Continued)

(58) Field of Classification Search
None
See application file for complete search history.

(56) References Cited

U.S. PATENT DOCUMENTS 5,903,063 A * 5/1999 Blaker .................. H02J 7/0063
307/10.6
10,223,842 B1 * 3/2019 Lee .......................... G01H 3/00
(Continued)

FOREIGN PATENT DOCUMENTS

CN 108566230 B * 3/2020 ............. F24F 11/58
JP 2009206609 A 9/2009
JP 2016201937 A * 12/2016

OTHER PUBLICATIONS

International Search Report, mailed Aug. 17, 2022, issued in corresponding PCT Application No. PCT/IB2022/054125, Filed May 4, 2022.
(Continued)

*Primary Examiner* — Fekadeselassie Girma

(57) ABSTRACT

An electric vehicle noise sniffer and methods of mitigating packet flow interruptions by noise cancellation and avoidance of noise region envelopes are provided. A vehicle comprises: electrical component(s) that operate according to data indications: and a power line that conveys the data indications and power to the electrical component(s). A
(Continued)

method comprises: determining an electrical characteristic of the data indications on the power line: determining a present electrical characteristic of noise on the power line and/or estimating a future electrical characteristic of the noise on the power line: and causing the data indications to change to a new electrical characteristic different from the present electrical characteristic and the future electrical characteristic of the noise on the power line to avoid interference of the noise with the data indications. The electrical characteristics are one or more of in frequency space, amplitude space and direct current offset space.

18 Claims, 9 Drawing Sheets

(51) Int. Cl.
  *B60R 16/03* (2006.01)
  *G01R 29/26* (2006.01)
  *H04B 3/46* (2015.01)
  *H04L 12/40* (2006.01)
  *H04W 4/46* (2018.01)
(52) U.S. Cl.
  CPC .............. *H04B 3/46* (2013.01); *H04L 12/40* (2013.01); *H04W 4/46* (2018.02); *H04B 2203/5495* (2013.01); *H04L 2012/40215* (2013.01)

(56) References Cited

U.S. PATENT DOCUMENTS

| | | | | |
|---|---|---|---|---|
| 10,692,304 | B1* | 6/2020 | Deyaf | G08G 1/202 |
| 2008/0298226 | A1* | 12/2008 | Mizutani | H04B 3/548 |
| | | | | 370/208 |
| 2010/0329320 | A1* | 12/2010 | Umehara | G06N 7/02 |
| | | | | 703/13 |
| 2011/0190967 | A1* | 8/2011 | Burk | B60L 53/665 |
| | | | | 701/469 |
| 2013/0195208 | A1* | 8/2013 | Umehara | H04L 27/2032 |
| | | | | 375/257 |
| 2015/0245181 | A1* | 8/2015 | Bai | H04W 4/16 |
| | | | | 455/414.1 |
| 2015/0365132 | A1* | 12/2015 | Yu | H04B 3/54 |
| | | | | 307/10.1 |
| 2016/0180605 | A1* | 6/2016 | Zula | G07C 5/00 |
| | | | | 701/29.1 |
| 2017/0106757 | A1* | 4/2017 | Weed | H04B 3/548 |
| 2017/0201584 | A1* | 7/2017 | Endo | B60R 16/023 |
| 2018/0276913 | A1* | 9/2018 | Garcia | B60L 3/0046 |
| 2019/0263336 | A1* | 8/2019 | Haga | G08G 1/0965 |
| 2019/0349394 | A1* | 11/2019 | Kishikawa | H04L 63/1416 |
| 2019/0363530 | A1* | 11/2019 | Jakupi | H02H 1/0092 |
| 2020/0007661 | A1* | 1/2020 | Kim | G08G 1/161 |
| 2020/0019170 | A1* | 1/2020 | Seo | H04W 4/44 |
| 2020/0026290 | A1* | 1/2020 | Lim | G05D 1/0022 |
| 2021/0347218 | A1* | 11/2021 | Huett | B60D 1/64 |
| 2021/0362733 | A1* | 11/2021 | Yoon | H04N 17/00 |
| 2022/0075338 | A1* | 3/2022 | Uthaicharoenpong | |
| | | | | G05B 19/042 |
| 2022/0113137 | A1* | 4/2022 | Knutson | G01C 21/16 |
| 2022/0377142 | A1* | 11/2022 | Yamamoto | H04L 45/66 |
| 2024/0204823 | A1* | 6/2024 | Mankowski | H04B 3/46 |
| 2024/0243774 | A1* | 7/2024 | Mankowski | H04W 4/46 |

OTHER PUBLICATIONS

Degardin, V., et al., "Feasibility of a High-Bit-Rate Power-Line Communication Between an Inverter and a Motor", IEEE Transactions on Industrial Electronic, vol. 61, No. 9, Sep. 2014, p. 4817.

Shekoni, O.M., "Detection and Reduction of Impulsive Noise in OFDM Using Machine Learning Techniques", Johannesburg, University of Johannesburg, 2019 [Retrieved on Jul. 6, 2022 (Jun. 7, 2022)], Retrieved from the Internet at URL: https://ujcontent.uj.ac.za/vital/access/services/Download/uj:33246/SOURCEI. p. 2, section 1.4.

Huang, X., "Power Line Communication for Automotive Applications", Thesis, Ryerson University, 2012 [Retrieved on Jul. 6, 2022 (Jun. 7, 2022)] Retrieved from the Internet at URL: https://scholar.archieve.org/work/s7u2i4kuxrcwlcscgp2dw6hgju/access/wayback/https://s3.ca-central-1.amazonaws.com/pstorage-ryerson-5010877717/28136772/Huang_Xiaoguang.pdf—entire document.

* cited by examiner

ELECTRIC VEHICLE NOISE SNIFFER AND METHODS OF MITIGATING PACKET FLOW INTERRUPTIONS BY NOISE CANCELLATION AND AVOIDANCE OF NOISE REGION ENVELOPES

CROSS-REFERENCE TO RELATED APPLICATIONS

The present specification claims priority to U.S. Patent Application No. 63/184,090 filed May 4, 2021, and further has priority to U.S. Patent Application No. 63/221,239 filed Jul. 13, 2022, the contents of all of which are incorporated herein by reference.

TECHNICAL FIELD

The present specification is directed to electric vehicle communication. More particularly, the present specification relates to an electric vehicle noise sniffer and methods of mitigating packet flow interruptions by noise cancellation and avoidance of noise region envelopes.

BACKGROUND

Electric vehicles are becoming a popular mode of transportation. However electrical noise may degrade quality of data communications between electrical components of an electric vehicles.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
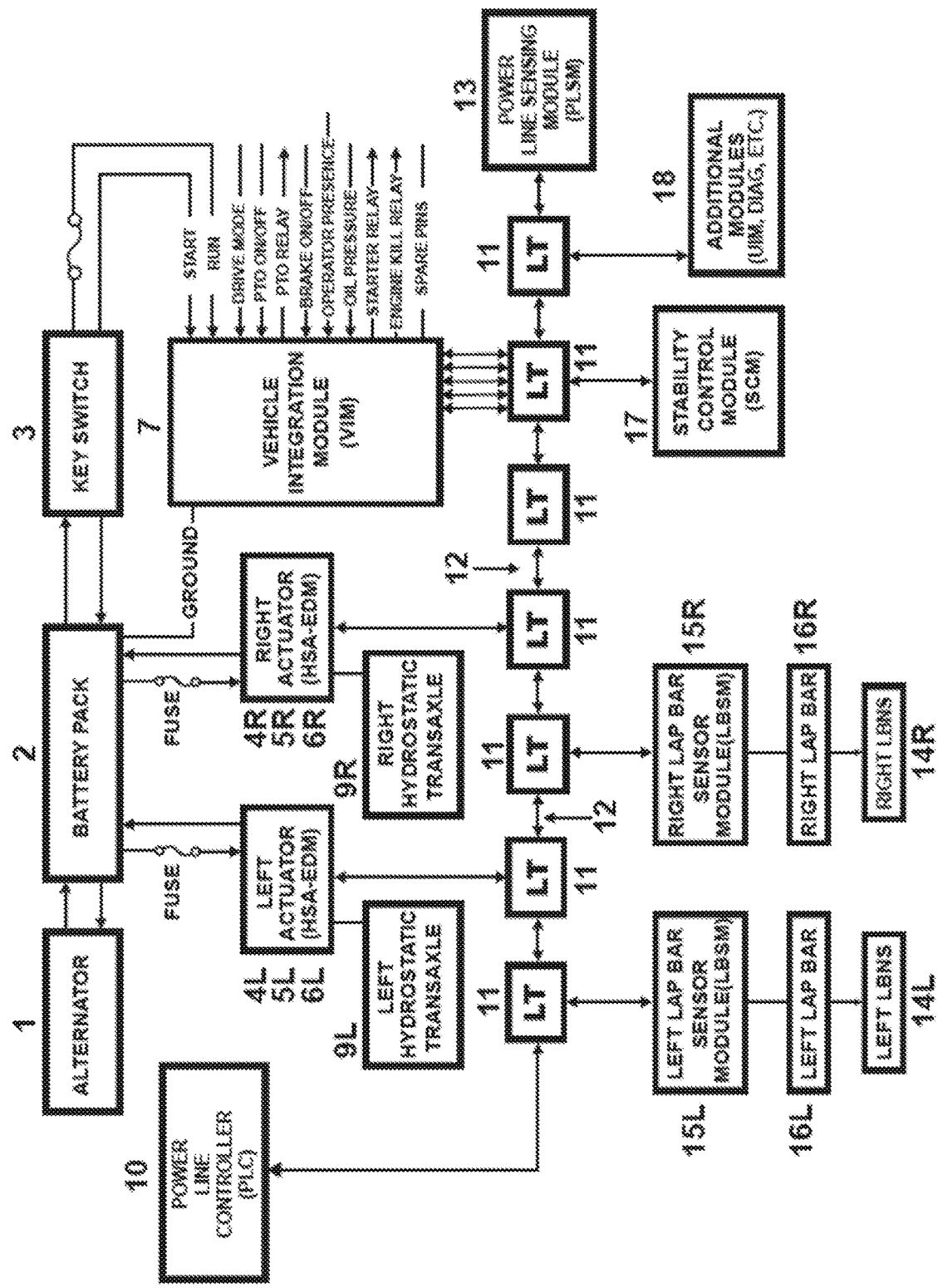
FIG. 1 is a schematic diagram of control and management system for a representative electric vehicle using power line cables, according to non-limiting examples.

Electric vehicles are becoming a popular mode of transportation. One popular data communication architecture for electric vehicles is the Controller Area Network (CAN), two-wires, protocol. It is applicable for overall connectivity and/or a point-to-point control. However CAN may be inconvenient to use and/or control of an electrical vehicle via CAN may be challenging.

As such, provided herein, are control systems based on a data communication architecture, which is based on power and ground harnesses; such a data communication architecture may be referred to hereafter as a Power Line Network Architecture (PLNA).

However, some examples herein describe systems and methods to control and communicate over power line cables or/and "traditional" wired protocols such as CAN, UART (universal asynchronous receiver-transmitter), I2C (Inter-Integrated Circuit), TTL (Time to Live), any suitable RS (Recommended Standard) protocol (e.g. such as RS-2XX, RS-4XX), SPI (Serial Peripheral Interface), Ethernet, amongst other possibilities, as a carrier of data.

Existing CANs and/or two-wire protocols, and the presently provided PLNA may co-exist in an electric vehicle, or the PLNA may be provided in place of a CAN and/or two-wire protocol. In instances where a CAN and/or two-wire protocols, and the presently provided PLNA are present in an electric vehicle, selection of one or more of the protocols may be operator programmable, and/or selection of one or more of the protocols may occur via self-assembly, for example using machine learning and/or programmatic techniques.

In particular examples, a control system provided herein may be for an electric vehicle, which may comprise an electric lawn tractor, and/or any suitable lawn maintenance electric vehicle. Such a control system may comprise, a vehicle controller, a power-line network operated according to the foregoing PLNA, a multiple electric transaxle controlled by respective vehicle controllers, and one or multiple drive and steering input devices connected to corresponding sensors to sense drive, breaks and steering inputs, for example from an operator. A controller provided herein may be generally configured to interact with one or multiple vehicle's components via the aforementioned PLNA.

For example, a controller provided herein may sense drive inputs, such as steering inputs, braking inputs, and the like, and translate such inputs into data indications for a power-line based protocol to post the data indications on a power-line network to obtain, monitor, and adjust speed and direction of movement of an electric vehicle. Such a controller may convert digital and/or analogue inputs into power-line packets to distribute them over the vehicle's network to drive transaxles to obtain a given motion, a given speed, a given acceleration, a given breaking action, and the like, in accordance with the drive inputs. However, noise on the power-line network may cause the electric vehicle to respond slowly to the drive inputs, or, in some scenarios, may cause drive inputs to not be translated into data indications causing the electric vehicle to at least partially fail.

As such, the PLNA provided herein may provide noise sensing and/or noise region avoidance for data indications, as well as noise statistics, noise alarms and determination of anticipated noise regions based on machine learning, and the like. Such noise sensing, and the like, may occur in both frequency and amplitude of the noise, as well as with respect to vertical offsets from a voltage baseline, which may be referred as a DC (direct current) offset.

In particular, provided herein is a noise sniffer and/or detector which may be a component of the PLNA, and which may be referred to hereafter as AINPS (Artificial Intelligence Noise Pattern Scanner and/or Sniffer), which may be implemented in a Power Line Sensing Module (PLSM). Such a PLSM may provide functionality for sniffing and/or detecting noise, which may include, but is not limited to: frequency sweeping of spectrum bandwidth used to communicate over a power-line network; flagging regions of the bandwidth which are estimated to include noise and/or estimated to include noise in the future (e.g. sensing and/or identifying and/or predicting noisy bandwidth regions); broadcasting, to other components of the electric vehicle, a "safe" region to use for transmission of data indications; and generating a signal in a corresponding spectrum region to combat and/or cancel noise.

A PLSM is understood to comprise any suitable combination of hardware, software, mechanical enclosures, cables, harness, user interfaces, operator feedbacks (e.g. such as any suitable combination of display screens, speakers, lights, light emitting diodes, and the like) and mounting apparatus to mounting such a PLSM inside of multiple types of electric vehicles.

The PLSM may monitor two data streams when available, either concurrently or separately, which may be based on an operator configuration, and which may include, but is not limited to, two or more data streams based on two or more of: power line communication such as the PLNA provided herein, and/or traditional power-line communications, wired protocols, CAN, UART, I2C, TTL, any suitable RS protocol, SPI, Ethernet, amongst other possibilities.

Furthermore, data indications may be full duplex (RX/TX) posed as packets on power lines which may comprise a ground (GND) cable and/or line and a voltage common collector (VCC) cable and/or line, for example the power cable of the power line cables 12. A level of voltage on a power line which represent a data indication may be dynamically sensed and fed back to the controller.

Hereafter, a bus over which data indications may be provided on a power line may be referred to as a PLNA bus.

An electronics drive module (e.g. a vehicle control module and/or a vehicle integration module) provided herein may be configured to detect and interpret the drive input message posted on the PLNA bus, compute and output control signals based on a drive output message as well as the status, direction, speed, inertia, acceleration, braking of drive output devices and provide a drive output signal to a drive system using power line transmission-based packets.

Implementations of the described techniques may include hardware, a method or process, or computer software on a non-tangible computer-readable medium. Other examples include corresponding computer systems, apparatus, and computer programs recorded on one or more computer storage devices, each configured to perform the actions of the methods.

One general aspect includes a method of sensing and sharing the properties of a power line environment, which may include, but is not limited to, noise distribution, voltage drifts, and/or noise statistics through a power-line network via the aforementioned PLNA. The steering and the drive inputs may be coupled with the rest of the system via a PLNA physical network layer (e.g. cables of the PLNA).

A PLNA network topology provided herein may be based on so called "Ad-HOC Self Assembly" such that no single point of failure occurs, the PLNA network topology connecting as many nodes of the system to as many other parts of the system when power is being delivered.

A PLNA network protocol provided herein may be based on so called "Full-Duplex" bi-directionality with a payload, security, and frequency to use for data transmission and/or administrative tasks.

Identification of noise regions as provided herein may be implemented by searching for noise regions in both a frequency domain and/or space, an amplitude domain and/or space, and a vertical GND=>VCC direction which may be referred to as a DC offset domain and/or space. Two-dimensional and/or three-dimensional modelling of noise (e.g. using two or three of frequency, amplitude and DC offset) may provide for improved noise detection. For example, searching for noise regions in a frequency space may comprise searching for frequencies and/or frequency bandwidths of noise, whereas searching for noise regions in an amplitude space and/or a DC offset space may comprise searching for amplitudes of noise and/or a direct current offset of noise from a ground and/or 0V. In particular, in an amplitude space and/or a DC offset space, noise may have an amplitude with a base voltage and/or lowest voltage that is higher than 0V; hence noise may be referred to as having a given amplitude that is offset from 0V by a given voltage, and at a given frequency and/or range of frequency. Indeed, data indications as described herein may similarly be at a given respective frequency, with a given respective amplitude that is offset from 0V by a given respective DC voltage.

Some examples herein describe systems and methods to control and communicate over a power line cables as a carrier of data. This may include connecting one or multitude of devices, exchange of information, configuration, and parameters.

Some examples herein describe systems and methods of reading operator's controls to translate those into a digitized data, payload packets encapsulated into a PLNA Bus. For example, expected vehicle turn, acceleration or/and rate of breaking profile shared as digital sequence of PLNA Bus packets. Hereafter, such digitized data provided in packets may be referred to hereafter, more generically, as a data indication and/or data indications.

Furthermore, provided herein is a vehicle drive and control system that incorporates communication among two or multiple functional blocks over power line cables (GND and POWER and/or VCC) as a full duplex, exchange of configurable packets. Various types of items might be connected to the power line and to one another for communication and exchanging information with or without being directly connected to one another. Not only does the use of a power line medium simplify a vehicle's electrical harness, number of connections and the corresponding connectors, but the use of a PLNA Bus to provide packets over GND and VCC cables allows for additional flexibility in components' placements on vehicles equipped with a such system. The vehicle drive and control system described herein may be capable of sensing all operator's controls for direction, turning, acceleration, braking amongst other possibilities.

In one example, a vehicle drive and various controllers described herein may be configured to sense steering and speed outputs from a pair of lap bars, without any additional wiring other than two cables (GND and VCC) of a power line. In such an example, a set of commands may be encapsulated in blocks and transmitted over the PLNA Bus packets for all blocks connected to the PLNA Bus packets to receive, read and respond (e.g. if necessary), for example at a particular frequency.

In some examples, a physical motion of the vehicle control inputs is not necessary. For example, an operator's body parts (e.g. via detected pressure and/or gestures) and/or an operator's voice commands may be detected by suitable detection devices, and translated into commands that are shared on the network. A process by which an operator's desired motion of the vehicle and the vehicle response to that command is hence understood to be independent of a type of input applied. Systems of the present specification may be provided in any suitable number of configurations and adjustable parameters that are either forced by an operator or autonomously tuned.

In particular, an aspect of the present specification provides a vehicle comprising: one or more electrical components configured to operate according to data indications; a power line configured to convey both the data indications and power to the one or more electrical components; and a controller configured to: determine an electrical characteristic of the data indications on the power line; one or more of: determine a present electrical characteristic of noise on the power line; and estimate a future electrical characteristic of the noise on the power line; and cause the data indications to change to a new electrical characteristic that is different from the present electrical characteristic of the noise on the power line and the future electrical characteristic of the noise on the power line to avoid interference of the noise with the data indications, wherein electrical characteristics are one or more of in frequency space, amplitude space and direct current (DC) offset space.

Another aspect of the present specification provides a method comprising: at a vehicle comprising one or more electrical components configured to operate according to data indications and a power line configured to convey both the data indications and power to the one or more electrical components, determining, at the vehicle, an electrical characteristic of the data indications on the power line; one or more of: determining, at the vehicle, a present electrical characteristic of noise on the power line; and estimating, at the vehicle, a future electrical characteristic of the noise on the power line; and causing, at the vehicle, the data indications to change to a new electrical characteristic that is different from the present electrical characteristic of the noise on the power line and the future electrical characteristic of the noise on the power line to avoid interference of the noise with the data indications, wherein electrical characteristics are one or more of in frequency space, amplitude space and direct current (DC) offset space.

Yet a further aspect of the present specification provides a non-transitory computer-readable medium storing a computer program, wherein execution of the computer program is to implement a method comprising: at a vehicle comprising one or more electrical components configured to operate according to data indications and a power line configured to convey both the data indications and power to the one or more electrical components, determining, at the vehicle, an electrical characteristic of the data indications on the power line; one or more of: determining, at the vehicle, a present electrical characteristic of noise on the power line; and estimating, at the vehicle, a future electrical characteristic of the noise on the power line; and causing, at the vehicle, the data indications to change to a new electrical characteristic that is different from the present electrical characteristic of the noise on the power line and the future electrical characteristic of the noise on the power line to avoid interference of the noise with the data indications, wherein electrical characteristics are one or more of in frequency space, amplitude space and direct current (DC) offset space.

Figure 5:
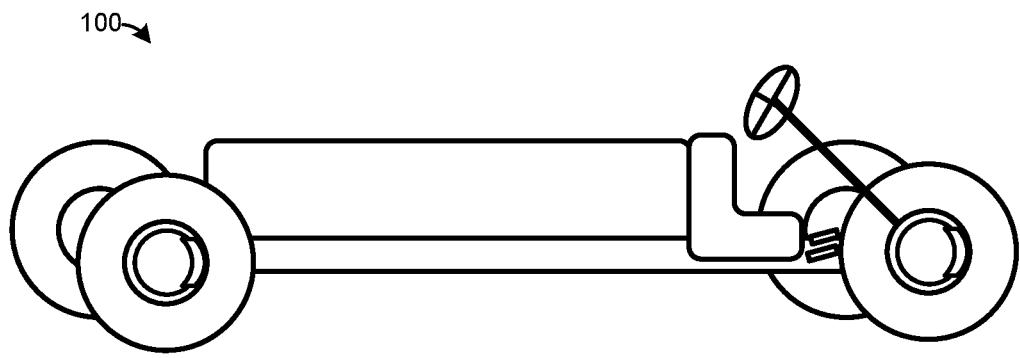
FIG. 5 depicts a view of an electric vehicle, according to non-limiting examples.

Referring to FIG. 1, there is a schematic diagram of an electric vehicle components using power line for communication; an example of such an electric vehicle 100 is depicted in perspective in FIG. 5. Such an electric vehicle 100 may comprise the components depicted in FIG. 1. For simplicity, the electric vehicle 100 is interchangeably referred to hereafter as the vehicle 100.

The components depicted in FIG. 1 may include a battery pack 2 with a plurality of rechargeable batteries, such as lithium-ion batteries or nickel-metal-hydride batteries. The electric vehicle may be a car, a golf cart, a riding lawn mower, or another vehicle having wheels powered by the rechargeable battery pack 2. Other components may include an alternator 1, a key-switch 3, left actuators 4L, 5L, 6L and corresponding right actuators 4R, 5R, 6R, a Vehicle Integration Module (VIM) 7 may provide all features, functions, and controls such as START, RUN, DRIVE MODE, BRAKES, ENGINE KILL, INSTANTANEOUS SWITCH, among other possibilities (e.g. a PTO (Power Take Off) on/off and/or relay, operator presence detection, oil pressure detection, etc.).

Communication between the components may occur via a Power Line 12. Other peripherals 11 may include any additional components capable of being added to the power line 12 to send and receive packets. Power line 12 may comprise a GND line and/or cable, and a VCC line and/or cable.

As depicted, Left Lap Bar Sensor (LBNS) 14L and Right Lap Bar Sensor (RBNS) 14R, respectively incorporated into a Left Lap Bar Sensor Module (LBSM) 15L and a Right LBSM 15R together with respective left and lamp bars 16L and 16R, are also connected to the power line via the Left and Right LBSM 15L, 15R, to receive both energy (power) and communication protocol packets, and the like.

Power Line Controller 10 provides system level network management functionality, and controls of packet transmission, topology and pilot frequencies used for data transmission on the power line 12. Power Line Sensing Module (PLSM) 13 monitors power line noise and interference regions, trends in transmission failures and assigns carrier frequencies for data indications (e.g. packets) being provided on the power line 12.

A Stability Control Module (SCM) 17, and any other suitable modules 18 (e.g. such as a mezzanine daughter card outlet), may be connected through suitable ports and may be user defined.

While not depicted, the components may further include components for providing lawn mower functionality, and the like, such as one or more mower blade units that may be controlled by the vehicle integration module 7 to be on or off, and/or controlled by the vehicle integration module 7 to a particular speed (e.g. a rotational speed and/or cutting speed, and the like).

Figure 2:
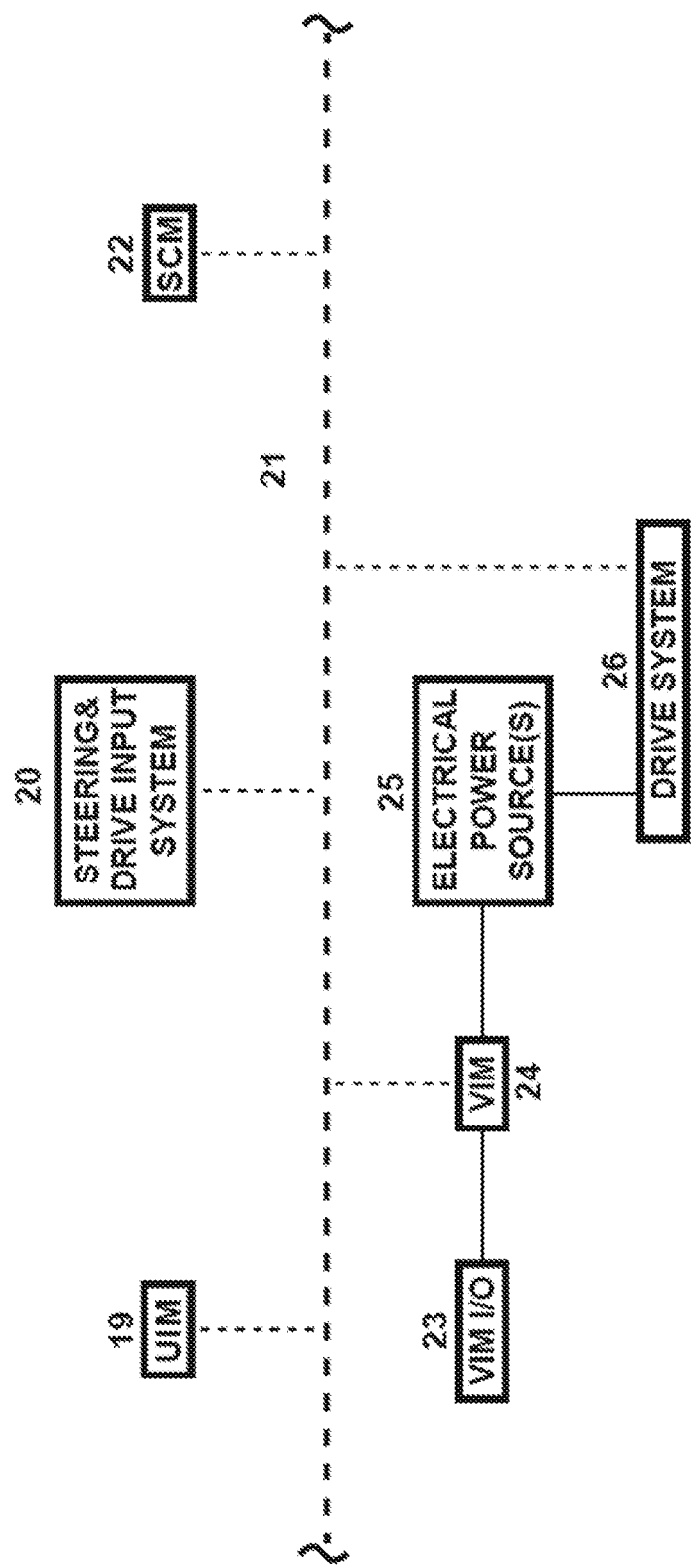
FIG. 2 is a schematic diagram of a vehicle control and drive, according to non-limiting examples.

Referring to FIG. 2, a vehicle communication platform of a drive and control system is depicted, that may be used with the vehicle 100. The vehicle communication platform of FIG. 1 may include a Steering and Drive Input system 20, Power line cables (GND and Power) 21, drive system 26, User Interface Module (UIM) 19, Stability Control Module (SCM) 22 (e.g. which may be the same or different as the SCM 17 of FIG. 1), Vehicle Integration Module (VIM) IO 23, and Electrical Power Source (EPS) 25 such as the rechargeable battery pack 2. Such a power line network configuration allows for additional flexibility of connecting blocks over multiple inputs and outputs, and may be used in place of, and/or to complement, the system depicted in FIG. 1. For example, a Key switch 33 (e.g. a key switch) provides a beginning of a start-up sequence and GND/VCC presence allows for a power line communication protocol to be enabled shortly thereafter, and the like. It is understood that there is absence of any additional cables, harnesses and interfaces other that two electrical cables (GND/PWR) of the power line cables 12 performing two main functions:

Energy delivery to the entire system

Communication protocol PHY (physical) layer for a full duplex (RX/TX) packet distribution.

Figure 3:
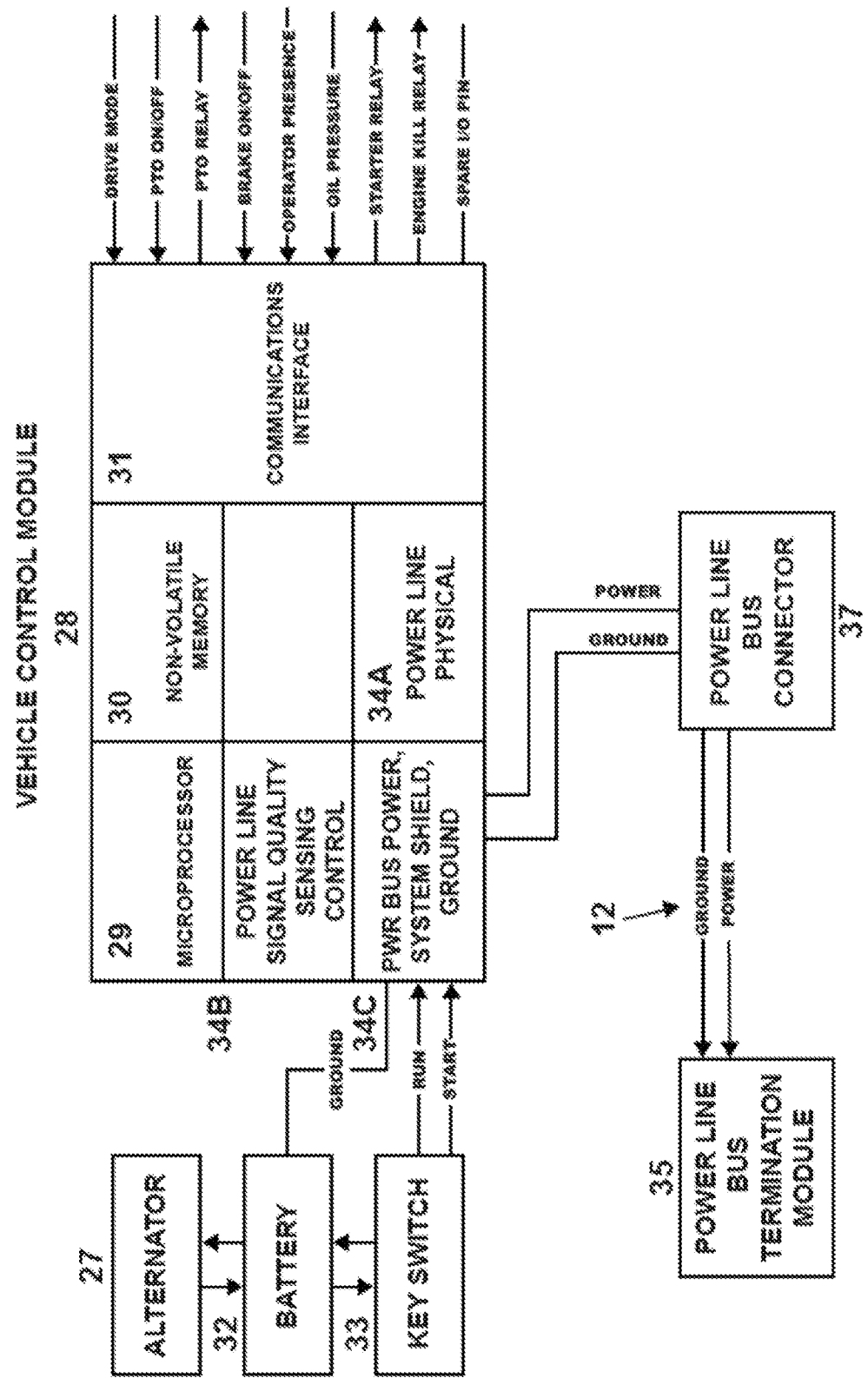
FIG. 3 is a block diagram of a Vehicle Control Module, ports, connectivity and accessories, according to non-limiting examples.

Referring to FIG. 3, a platform that includes a Vehicle Control Module (VCM) 28 is depicted, that may be used with the vehicle 100 and may be used to complement the system depicted in FIG. 1 and/or the vehicle communication platform of FIG. 2.

The VCM 28 includes a microprocessor 29, Memory 30, Communication interface 31, Power Line Signal Quality Sensing Control (PLSQSC) 34B, Power Bus, shield 34C, Power Line PHY Layer module 34A. The VCM 28 may connect to the power line 12 via a power line bus connector 37. Power line bus termination module 35 on the power line 12 provides noise tempering, echo cancellation and a carrier RX/TX avoidance while transferring packets. The power line bus termination module 35 may be the same or different as the PLSM 13 of FIG. 1.

The VCM 28 may be connected to an alternator 27, a battery 32 and a key switch 33, which may be the same, or different, as the alternator 1, the battery pack 2, and the key-switch 3 of FIG. 1.

Figure 4:
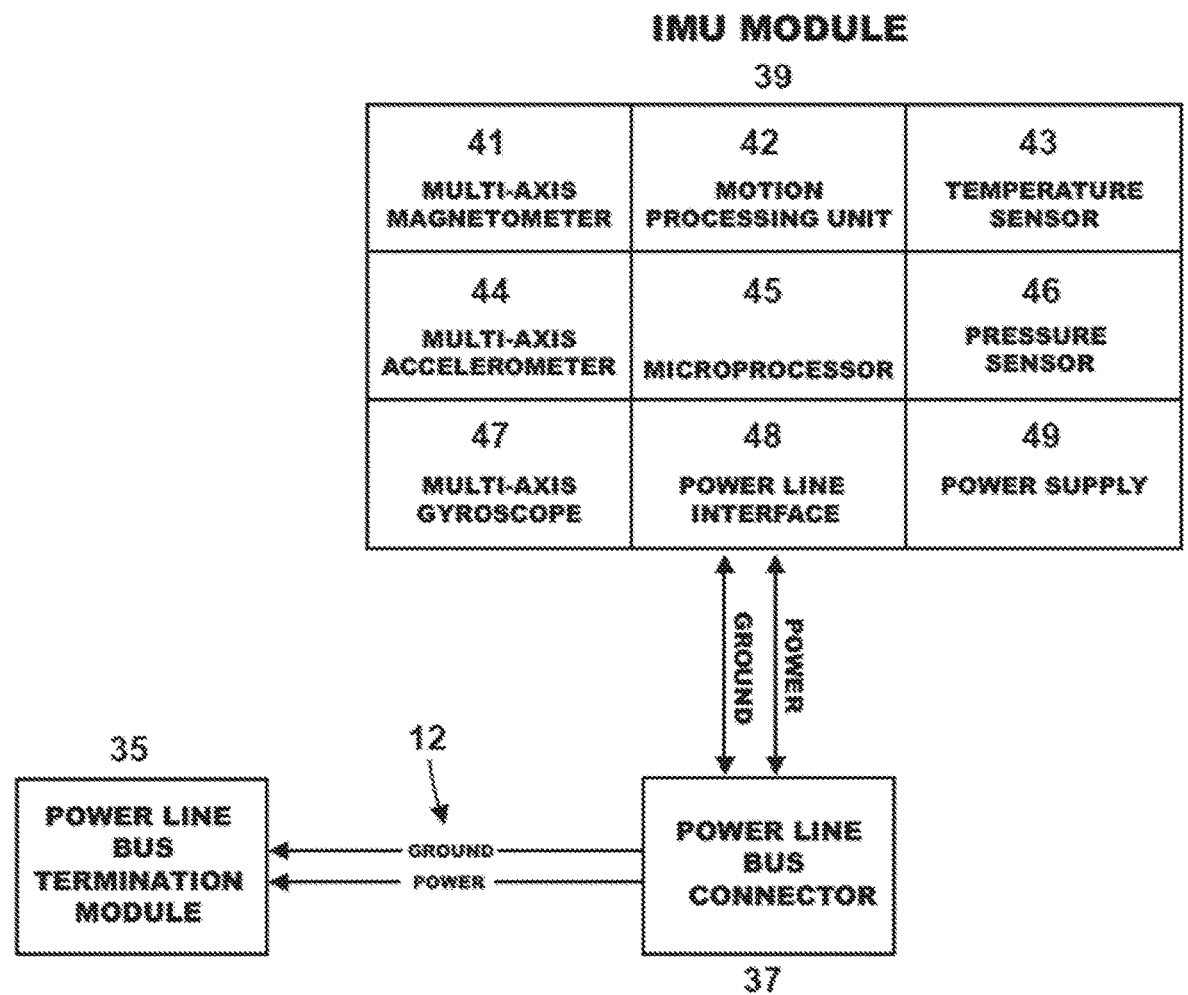
FIG. 4 is a block diagram of an IMU (inertial measurement unit) Module comprising a combination of multiple sensors giving information about the motion of a vehicle, according to non-limiting examples.

Referring to FIG. 4, a system that includes an IMU (inertial measurement unit) MODULE 39 is depicted, that may be used with the vehicle 100 and may be used to complement the system depicted in FIG. 1 and/or the vehicle communication platform of FIG. 2 and/or the VCM 28 of FIG. 3.

The IMU module 39 includes a magnetometer 41, temperature sensor 43, accelerometer 44, pressure sensor 46, gyroscope 47, power line interface 48, power supply 49 and on-board microprocessor 45. As depicted, the IMU module 39 may connect to the power line 12 via the power line bus connector 37, as well as to the Power line bus termination module 35.

In some embodiments, the VCM 28 and/or the vehicle integration module (VIM) 7 may be part of the electric vehicle platform connecting to one or multiple VCM 28 units and/or VIM 7 units. For example, a VIM 7 and/or a VCM 28 may be part of a Large Area Network using the power line 12 that spans to trailers, external attachments, street power charging stations and hydro infrastructure with their own VIMs and/or VCMs. During normal operation of the vehicle 100, a connecting topology may "explore" all power lines 12 existing connections to self-assemble the best arrangement to avoid a single point of failure. When the vehicle 100 is turned off, VIM 7 and/or a VCM 28 may transfer operation of a CAN bus to other blocks connected to the power line network, through a handshake protocol or another state-change process.

In other examples, the VIM 7 and/or the VCM 28 may integrated as part of a battery management system and separate from the power line 12 architecture. Encapsulating the VIM 7 and/or a VCM 28 may convert it into a local, battery control module.

Figure 6:
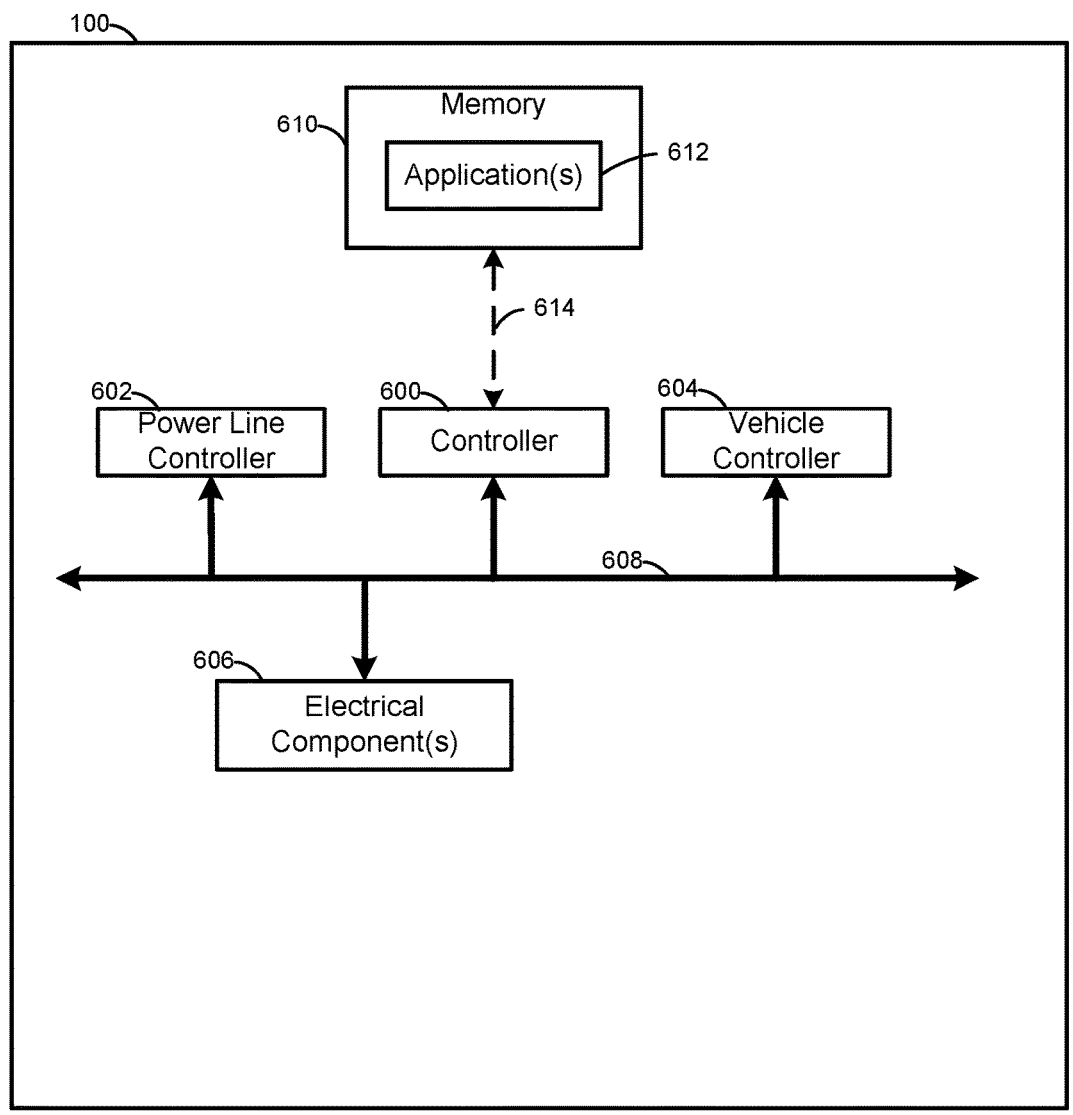
FIG. 6 depicts a simplified block diagram of an electrical system of an electric vehicle, according to non-limiting examples.

Attention is next directed to FIG. 6 which depicts a simplified block diagram of one or more of the features depicted in FIG. 1, FIG. 2, FIG. 3 and FIG. 4 integrated into the electrical vehicle 100. As depicted, the vehicle 100 comprises a controller 600 that may correspond to the PLSM 13 and/or the power line bus termination module 35. The vehicle 100 further comprises a power line controller 602 and a vehicle controller 604 which may respectively correspond to the power line controller 10, and the VIM 7 and/or the VCM 28. The vehicle 100 further comprises one or more electrical components 606 which may correspond to any of the components of FIG. 1, FIG. 2, FIG. 3 and FIG. 4 that operate and/or may be controlled according to data indications and/or any other suitable electrical components. Indeed, the power line controller 602 and/or vehicle controller 604 may also comprise respective electrical components that operate and/or may be controlled according to data indications. In particular, the one or more electrical components 606 may comprise one or more power conversion components, such as a motor and the like, and/or the one or more electrical components 606 may comprise a communication unit, such as communication unit, and/or wireless communication unit, configured to wirelessly communicate via any suitable protocol including, but not limited to, WiFi, Bluetooth™, Internet of Things protocols, and the like.

Furthermore, as depicted, the vehicle 100 comprises a power line 608 which may correspond to the power line 12 and/or the power line cables 21.

In particular, it is understood that the power line 608 is generally configured to convey both data indications and power to the one or more electrical components 606 as described above.

In particular, as depicted, the power line 608 conveys data indications between the controllers 600, 602, 604 and the one or more electrical components 606. While not depicted, the vehicle 100 further comprises a power source, such as the battery pack 2 and/or the battery 32, which provides power over the power line 608.

While not depicted, one or more of the electrical components 606 may be connected to the power line 608 via a power line bus connector, such as the power line bus connector 37.

The power line controller 602 may control packet transmissions, frequencies, amplitudes, and DC offsets of data indications on the power line 608 and the vehicle controller 604 may control the one or more electrical components 606 based on operator input.

While not depicted, the vehicle 100 may comprise other components, such any of the other components described above with respect to FIG. 1, FIG. 2, FIG. 3 and FIG. 4.

The controllers 600, 602, 604 may comprise a respective processor and/or a respective plurality of processors, including but not limited to one or more central processors (CPUs), one or more microprocessors, and/or one or more graphics processing units (GPUs) and/or one or more processing units. Regardless, the controllers 600, 602, 604 comprise a respective hardware element and/or a respective hardware processor. Indeed, in some implementations, the controllers 600, 602, 604 may comprise a respective ASIC (application-specific integrated circuit) and/or a respective FPGA (field-programmable gate array) specifically configured for implementing respective functionality as described herein. Hence, the controllers 600, 602, 604 may not be generic controllers, but devices specifically configured to implement specific functionality as described herein. For example, the controller 600 may specifically comprise a computer executable engine configured to implement functionality of blocks of the method described with respect to FIG. 7.

It is further understood that functionality of one or more of the controllers 600, 602, 604 may be combined in a single controller.

As depicted, at least the controller 600 is connected, for example via a data line, to a memory 610 storing one or more applications 612, which may be used to implement the functionality of the controller 600. In particular, the controller 600 may retrieve and execute the one or more applications 612 from the memory 610 to implement functionality thereof. While the controller 600 and the memory 610 are depicted as being in communication via a data line 614, which is depicted as a broken line to distinguish from a solid line of the power line 608, the controller 600 and the memory 610 may alternatively be connected vis the power line 608. While not depicted, the controllers 602, 604 may alternatively be connected to the memory 610, or other memories, storing respective applications for implementing the functionality of the controllers 602, 604.

The memory 610 may comprise any suitable combination of volatile and non-volatile memories including, but not limited to, random access memory (RAM), flash memory, amongst other possibilities. The memory 610 may alternatively be a component of the controller 600.

For simplicity, the one more applications 612 are interchangeably referred to hereafter as the application 612.

The application 612 may include respective numerical algorithms, and/or programmed algorithms, predetermined algorithms, and/or static algorithms configured to at least estimate a future electrical characteristic of noise on the power line 608 and, alternatively, and/or in addition, predict electrical characteristics of noise on the power line 608 when one or more of the electrical components 606 are actuated. Other possibilities are described in more detail below.

Alternatively, and/or in addition to numerical algorithms, and/or programmed algorithms, predetermined algorithms, and/or static algorithms, the application 612 may include machine learning models and/or algorithms, and the like, which have been trained to at least estimate a future electrical characteristic of noise on the power line 608 and, alternatively, and/or in addition, predict electrical characteristics of noise on the power line 608 when one or more of the electrical components 606 are actuated. Other possibilities are described in more detail below.

Furthermore, in these examples, the application 612 may initially be operated by the controller 600, or another controller, in a training mode to train the machine learning models and/or algorithms of the application 612 to perform the functionality described herein, and/or generate classifiers and/or neural network layers therefor. However, the application 612 may be operated by the controller 600, or another controller, in the training mode at any suitable time, for example to continue to train the machine learning models and/or algorithms. Alternatively, classifiers and/or neural network layers, and the like, for implementing the functionality described herein may be received from another vehicle and/or computing device, for example via a communication unit.

The one or more machine learning models and/or algorithms of the application 612 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, any suitable machine learning algorithm and/or deep learning algorithm and/or neural network is within the scope of present examples.

Figure 7:
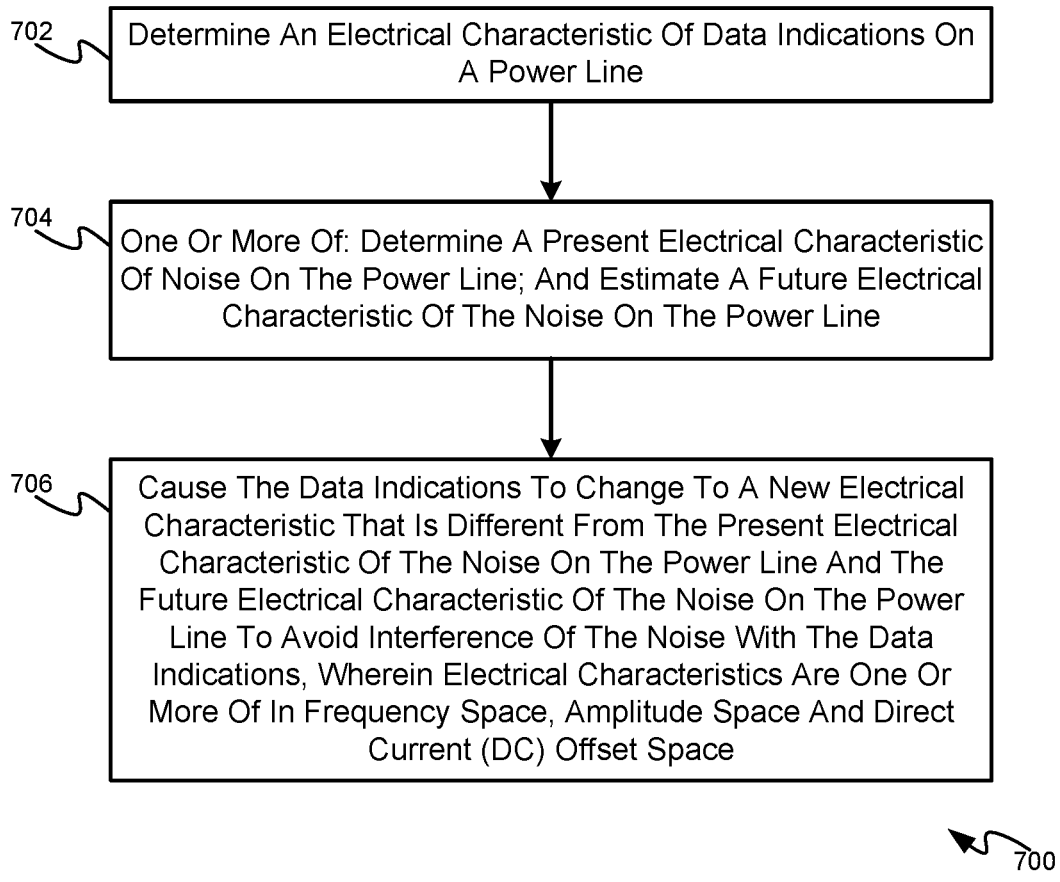
FIG. 7 depicts a flow chart of a method for causing data indications on a power line to change to a new electrical characteristic that is different from present electrical characteristic of noise on the power line and future electrical characteristic of the noise on the power line to avoid interference of the noise with the data indications, according to non-limiting examples.

Attention is now directed to FIG. 7 which depicts a flowchart representative of a method 700 for causing data indications on a power line to change to a new electrical characteristic that is different from present electrical characteristic of noise on the power line and future electrical characteristic of the noise on the power line to avoid interference of the noise with the data indications. The operations of the method 700 of FIG. 7 correspond to machine readable instructions that are executed by the controller 600. In the illustrated example, the instructions represented by the blocks of FIG. 7 are stored at the memory 610 for example, as the application 612. The method 700 of FIG. 7 is one way in which the controller 600 and/or the vehicle 100 may be configured. Furthermore, the following discussion of the method 700 of FIG. 7 will lead to a further understanding of the vehicle 100, and its various components.

The method 700 of FIG. 7 need not be performed in the exact sequence as shown and likewise various blocks may be performed in parallel rather than in sequence. Accordingly, the elements of method 700 are referred to herein as "blocks" rather than "steps." The method 700 of FIG. 7 may be implemented on variations of the vehicle 100 of FIG. 1, as well.

Furthermore, hereafter, reference will be made to electrical characteristics of data indications and/or noise on the power line 608. It is understood that such electrical characteristics may be in one or more of in frequency space, amplitude space and direct current (DC) offset space. In frequency space, the electrical characteristics may include a region of frequencies of data indications and/or noise, and which may include, but is not limited to, a bandwidth thereof.

Furthermore, hereafter, reference will be made to electrical components of the vehicle 100, which may include, but is not limited to, any suitable combination of the power line controller 602 and/or the vehicle controller 604 and/or the electrical components 606.

At a block 702, the controller 600 and/or the vehicle 100 determines an electrical characteristic of the data indications on the power line 608.

For example, the power line controller 602 may initially control the data indications to be at a given frequency (and/or range of frequencies), a given amplitude and a given DC offset, and communicate such electrical characteristics to the controller 600.

Alternatively, the controller 600 may scan a given range of frequencies (e.g. the entire bandwidth of the power line 608, which may be in a range of 20 MHz to 5 GHz, or any other suitable range) and further the controller 600 may be configured to, and/or trained to, recognize a data indication and/or distinguish a data indication from noise. Such scanning may include sampling signals (e.g. voltages and/or currents), and the like, in discrete bandwidth steps, such as 5 kHz frequency steps, and/or any other suitable size of step (e.g. 10 kHz, 20 kHz, amongst other possibilities), and determining that certain signals detected during the sampling are data indications, as well as determining electrical characteristics thereof including, but not limited to one or more frequencies of the data indication, a bandwidth of the data indication, an amplitude of the data indication, and a DC offset of the data indication.

However, any suitable type of scanning of the power line 608 is within the scope of the present specification including, but not limited to, one or more of frequency scanning, DC offset sweeping, frequency hopping, spread spectrum scanning, Fourier Transforms, Fast Fourier Transforms (FFTs), and the like.

As has been previously described, the data indications may be in the form of packets, and transmission of the data indications on the power line 608 may be referred to as packet flow.

At a block 704, the controller 600 and/or the vehicle 100 one or more of: determines a present electrical characteristic of noise on the power line 608; and estimates a future electrical characteristic of the noise on the power line 608. Indeed, such functionality may be referred to as "noise sniffer" functionality.

To determine a present electrical characteristic of noise on the power line 608, the controller 600 may scan perform the aforementioned scanning and determine that certain signals detected during the sampling correspond to noise. The controller 600 may further determine electrical characteristics via such scanning.

In particular, the controller 600 may be further configured to determine a present electrical characteristic of the noise on the power line 608 by one or more of: frequency scanning over a given frequency domain (e.g. bandwidth) on the power line 608; determining an amplitude of the noise on the power line 608; and determining a DC offset of the noise on the power line 608. In general, the controller 600 is hence configured to determine noise region envelopes of noise on the power line 608, where the term "envelope" may refer to a "shape" of the noise with respect to frequencies, bandwidth, amplitude and DC offset of the noise.

It is further understood that the controller 600 may be configured to estimate a future electrical characteristic of the noise on the power line 608 by: performing a plurality of determinations of present electrical characteristics of the noise over time; comparing the present electrical characteristics of the noise as they change over time to identify a pattern of change of the present electrical characteristics; and using the pattern of change of the noise to estimate the future electrical characteristic at a given future time.

For example, the controller 600 may perform a series of frequency scans on the power line 608 over time (e.g. when one frequency scan is completed, a next frequency scan is started), and determine that the frequency of the noise, the amplitude of the noise and/or a DC offset of the noise is changing over time, for example according to a pattern. In particular examples, the noise may be drifting higher or lower in frequency, and/or the noise may be expanding or contracting in bandwidth, and/or the noise may be drifting higher or lower in amplitude, and/or the noise may be drifting higher or lower in DC offset. The controller 600 may identify these patterns of change of the electrical characteristics of the noise and predict that the noise may change to future characteristics at a future time, for example in manner that would interfere with the data indications.

Put another way, the controller 600 is generally configured to determine and/or track statistics of the noise, which may be used to predict and/or estimate a noise envelope at a future time, a noise distribution at a future time, voltage drifts of the noise at a future time, and the like.

In some examples, the controller 600 may determine that, at a future time, frequencies of the noise may overlap with respective frequencies of the data indication due, for example, frequencies of the noise drifting towards the frequencies data indication and/or a bandwidth of the noise expanding to include the frequencies data indication.

Alternatively, and/or in addition, the controller 600 may determine that, at a future time, an amplitude of the noise may be higher than respective amplitude of the data indications, and/or that an amplitude of the noise may cause a signal-to-noise ratio (SNR) that is below a threshold SNR (which can be preconfigured at the vehicle 100, for example at the memory 610). The threshold SNR may generally comprise any suitable SNR below which electrical components of the vehicle 100 may not be able to process the data indications and/or below which communications on the power line 608 may fail. Put another way, the threshold SNR may comprise any suitable SNR below which the vehicle 100 is heuristically determined to at least partially fail and/or not respond quickly enough to operator inputs. However, any suitable threshold SNR is within the scope of the present specification.

Alternatively, and/or in addition the controller 600 may determine that, at a future time, a DC offset of the noise may similarly cause an amplitude of the noise to be higher than respective amplitude of the data indications, and/or may cause an SNR to be below the threshold SNR.

As has already been described, the controller 600 may be further configured to estimate the future electrical characteristic of the noise on the power line 608 using one or more machine learning algorithms, and the like, for example using two or more electrical characteristics of a given type (e.g. frequency or amplitude or DC offset), determined at different times, as input to the one or more machine learning algorithms to predict a future electrical characteristic of the noise on the power line 608.

Furthermore, the controller 600 may be configured to estimate more than one type of future electrical characteristic of the noise on the power line 608 using the one or more machine learning algorithms.

Similarly, in a training mode, the controller 600 may be further configured to train the one or more machine learning algorithms to estimate the future electrical characteristic of the noise on the power line 608, for example using two or more electrical characteristics of a given type (e.g. frequency or amplitude or DC offset), determined at different times, as training input to the one or more machine learning algorithms and a later determined (e.g. at a later time) electrical characteristic of the noise as training output.

Similarly, the controller 600 may be further configured to train the one or more machine learning algorithms to estimate more than one type of future electrical characteristic of the noise on the power line 608 and/or to perform any other suitable functionality as described herein.

At a block 706, the controller 600 and/or the vehicle 100 causes the data indications to change to a new electrical characteristic that is different from the present electrical characteristic of the noise on the power line 608 and different from the future electrical characteristic of the noise on the power line 608, to avoid interference of the noise with the data indications.

For example, the controller 600 may be further configured to cause the data indications to change to the new electrical characteristic by one or more of: controlling the data indications to change to one or more of a given frequency, a given bandwidth, a given amplitude, and a given DC offset that one or more of: avoids one or more of a present frequency of the noise or a future estimated frequency of the noise; and achieves a given signal-to-noise ratio (SNR) and communicating one or more of the given frequency, the given bandwidth, the given amplitude, and the given DC offset to the one or more other components to cause the one or more other components to one or more of transmit and receive the data indications at one or more of the given frequency, the given bandwidth, the given amplitude, and the given DC offset.

For example, when the controller 600 is configured to control electrical characteristics of the data indications, the controller 600 may cause the electrical characteristics to change as described above. However, when one or more other components, such as the power line controller 602, is configured to control electrical characteristics of the data indications, the controller 600 may communicate the new electrical characteristics to the other component, to cause the other component, such as the power line controller 602, to change the electrical characteristics, as described above.

Indeed, the controller 600 may be further configured to determine the new electrical characteristics of the data indications that one or more of avoids one or more of a present frequency of the noise or a future estimated frequency of the noise; and achieve a given SNR. Such a determination may also occur using one or more machine learning algorithms, which may be trained accordingly.

Other features are within the scope of the present specification.

For example, the controller 600 may be further configured to cancel the noise on the power line 608. As such, the controller 600 may be configured to detect the noise, and broadcast and/or transmit noise cancellation signals on the power line 608, to reduce and/or eliminate noise on the power line 608.

In other examples, the controller 600 may be further configured to determine that one or more respective electrical characteristics of the noise is due to one or more of the one or more electrical components 606 being actuated; and when the one or more electrical components 606 are later actuated, cause the data indications to change to the new electrical characteristic to avoid interference of the noise with the data indications that is due to the one or more of the one or more electrical components 606 being actuated.

For example, the controller 600 may determine, via communications with the vehicle controller 604, and/or by monitoring data indications on the power line 608 that corresponds to an electrical component actuation signal, that after and/or when a given electrical component 606 is actuated, and/or after and/or when a given data indication is detected on the power line, certain types of noise occur on the power line 608. Such noise may be due to a motor starting, and the like, and the motor may be actuated via a given data indication from the vehicle controller 604. Furthermore, the noise from the motor may (e.g. always) occur at a given frequency and/or range of frequencies (e.g. bandwidth), and/or a given amplitude and/or at a given DC offset. Similarly, the noise from the motor may consistently change in a similar manner over time after the motor is actuated. Similarly, the noise from the motor (e.g. an amplitude thereof) may be proportional, and the like, and/or may depend on speed of the motor, and the like, which may also be indicated by given data indications. Regardless, the controller 600 may be configured to determine that the motor is actuated, and control electrical characteristics of data indications on the power line 608 to avoid interference with the noise. Similarly, as the noise changes, for example, as the motor speeds up or slows down, the controller 600 may control electrical characteristics of data indications on the power line 608 to control, for example, the SNR of the data indications.

Similar tracking of noise may occur for any other suitable electrical components including, but not limited to, a communication unit.

Furthermore, the controller 600 and/or the vehicle 100 may maintain a registry of noise and/or noise "regions" and/or noise envelopes which may occur on the power line 608 according to different states of the vehicle 100. Such a registry may be stored at the memory 610 and/or any other suitable memory.

For example, a state of the vehicle 100 may be determined to change as different operator inputs are received, for example via the vehicle controller 604. As noise is detected on the power line 608 when a state of the vehicle 100 changes, an envelope and/or electrical characteristics of such noise may be stored in the registry. At a later time, when the vehicle 100 enters a same state (e.g. same operator inputs are received), an envelope and/or electrical characteristics of corresponding noise may be retrieved from the registry and used to determine new electrical characteristics of data signals on the power line 608 to avoid the noise that may occur due to the operator inputs.

Alternatively, and/or in addition, when the vehicle 100 enters a same state (e.g. same operator inputs are received), the envelope and/or the electrical characteristics of the corresponding noise may be retrieved from the registry and used to cancel noise on the power line 608 (e.g. a noise cancellation signal may be determined). Alternatively, in some examples, an envelope and/or electrical characteristics of a corresponding noise cancellation signal may be stored in the registry, and when the vehicle 100 enters a same state (e.g. same operator inputs are received), the envelope and/or the electrical characteristics of the noise cancellation signal may be retrieved from the registry and used to cancel noise on the power line 608.

States of the vehicle 100 for which noise envelopes and/or electrical characteristics may be stored in the registry may include, but are not limited to: the vehicle 100 being in motion; the vehicle 100 not being in motion; the vehicle 100 being at particular speeds; the vehicle 100 accelerating and/or at particular accelerations; the vehicle 100 turning; the vehicle braking; the vehicle 100 being a battery charging state (e.g. connected to a battery charger); and/or any other suitable state. In examples where the vehicle 100 comprises an electric lawn tractor and/or a lawn maintenance vehicle and/or lawn mower, and the like, states of the vehicle 100 for which noise envelopes and/or electrical characteristics may be stored in the registry may include, but are not limited to: one or more (e.g. left and/or right) mower blade units of the vehicle 100 being on; mower blade units of the vehicle 100 being at particular speeds; and the like.

Indeed, regardless of when the data indications are changed to a new electrical characteristic, such changes may be implemented in a manner that minimizes power usage at the vehicle 100. For example, a frequency of a data indication may not, in some scenarios, be moved to avoid noise, but rather an amplitude and/or a DC offset of the data indication may be controlled to achieve an SNR above a threshold SNR; in these examples, the SNR of the data indication may be controlled to be above a given percentage of the threshold SNR, such as 5%, 10%, 15%, or any other suitable value, to ensure that the SNR is above the threshold SNR, but without excessive increase in power usage at the vehicle 100, for example to preserve battery life.

In yet further examples, the controller 600 may be further configured to share (e.g. via a communication unit) one or more indications of the future electrical characteristic of the noise on the power line 608 (amongst other possibilities) with other vehicles. In some of these examples, such sharing may occur using any suitable Internet-of-Things (IOT) protocol (e.g. presuming the vehicles, including the vehicle 100, are configured as IoT devices), however such sharing may occur via any suitable protocol, such as WiFi protocols, Bluetooth™ protocols, IP (Internet Packet) protocols, cell phone protocols, and the like For example, other vehicles having similar configurations as the vehicle 100 may behave similarly to the vehicle 100 with respect to noise generation. As such, once a machine learning model and/or algorithm at the vehicle 100 is trained to determine future electrical characteristics of the noise, and/or trained to adjust electrical characteristics of data indications to avoid interference with the noise and/or trained to adjust electrical characteristics of data indications based on actuation of one or more of the electrical components 606, the corresponding classifiers and/or neural network layers may be transmitted to the other vehicles such that corresponding machine learning models and/or algorithms may behave accordingly.

However, such sharing may occur in any suitable manner. For example, in scenarios where the controller 600 determines a range of frequencies in which noise is located on the power line 608, the controller 600 may transmit an indication of the range to the other vehicles so that the other vehicles may avoid using such a range of frequencies for data indications. Alternatively, the controller 600 may transmit an indication of a range of frequencies that are "safe" to the other vehicles so that the other vehicles may use such a "safe" range of frequencies for data indications; a "safe" range of frequencies is understood to include frequencies where noise is not usually located.

Similarly, the controller 600 and/or the vehicle 100 may receive (e.g. via a communication unit), from other vehicles one or more indications of electrical characteristic of respective noise on respective power line, such as a range of frequencies in which noise was located on respective power lines of the other vehicles and/or respective "safe" ranges of frequencies.

Indeed, the controller 600 and/or the vehicle 100 may receive (e.g. via a communication unit), from other vehicles, classifiers and/or neural network layers, as described herein, as determined at the other vehicles.

Figure 8:
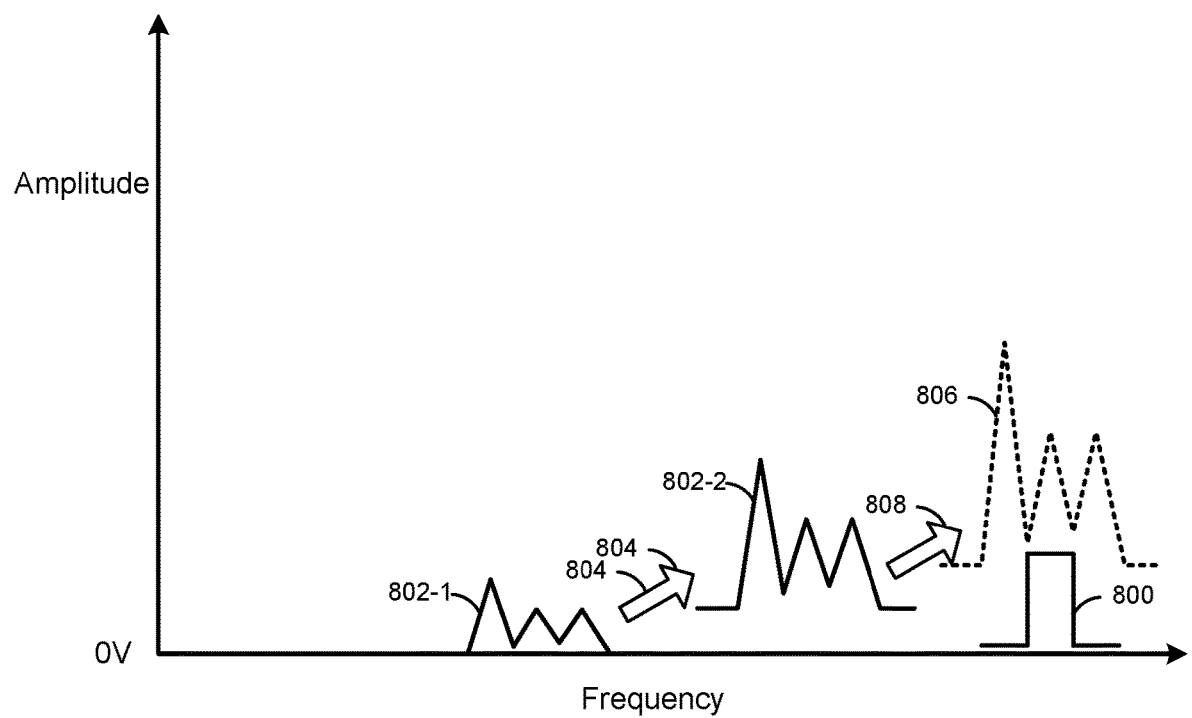
FIG. 8 depicts an example of a data indication, changing noise, and estimated noise on a power line, according to non-limiting examples.
Figure 9:
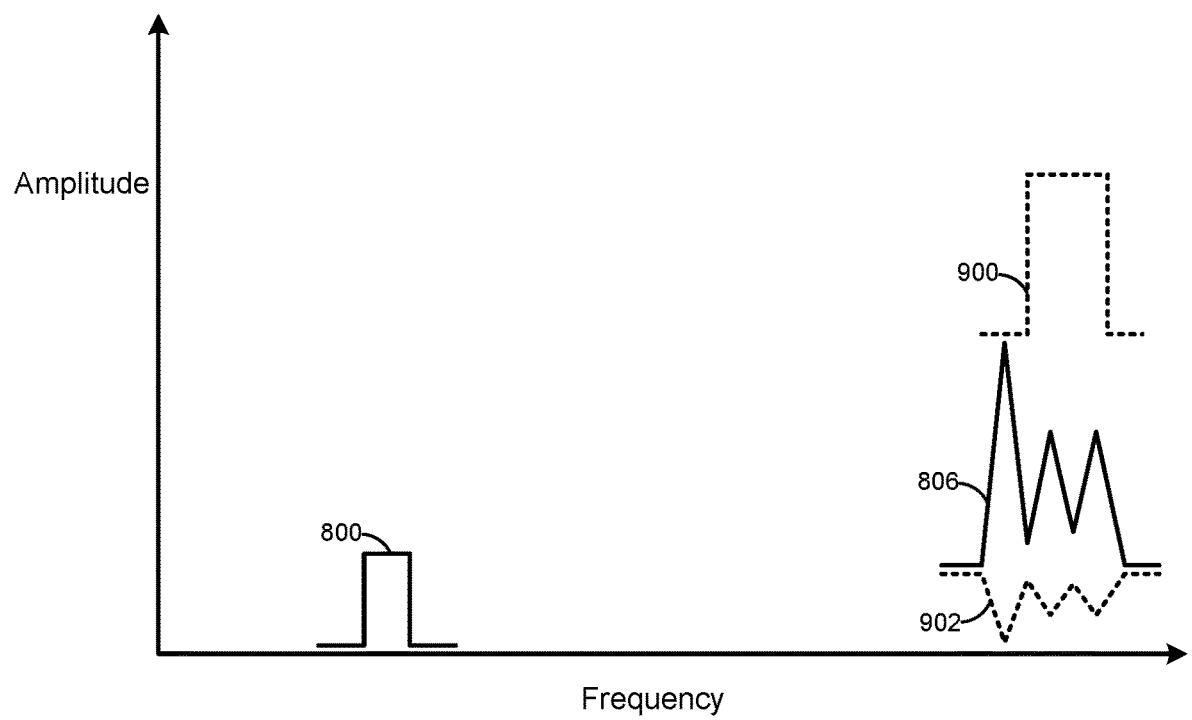
FIG. 9 depicts an example of a changed data indication changed to avoid interference with noise on a power line, according to non-limiting examples.

Attention is next directed to FIG. 8 and FIG. 9 which depict examples of aspects of the method 700. FIG. 8 and FIG. 9 depict data indications and noise in frequency/amplitude space (e.g. represented by a horizontal frequency axis, and a vertical amplitude axis), having electrical characteristics determined by the controller 600 as described herein. The amplitude axis, as depicted, begins at 0 volts, and hence when a minimum of data indications and noise are depicted above the frequency axis, the data indications and noise are understood to have a DC offset greater than 0 volts, as represented by an offset from 0 V along the amplitude axis. Furthermore, an amplitude of the data indications and noise are represented by depicted respective heights, and a frequency bandwidth of the data indications and noise are represented by depicted respective widths.

FIG. 8 depicts a data indication 800 and noise 802-1, 802-2. Electrical characteristics of the data indication 800 are understood to be determined by the controller 600 (e.g. at the block 702 of the method 700). The noise 802-1, 802-2 is understood to represent the same noise, but measured and/or determined (e.g. at the block 704 of the method 700) by the controller 600 at two instances in time. For example, the noise 802-2 is understood to comprise the noise 802-1, but measured and/or determined at a later time than the noise 802-1. As such, the noise 802-2 is understood to have changed 804 by increasing in frequency and frequency bandwidth, as well as increasing in amplitude and DC offset. In these examples, the data indication 800 is assumed to be stationary, with respect to the noise 802-1, 802-2.

Also depicted in FIG. 8 is an estimated noise 806 that is determined, for example by the controller 600, and estimated 808 from the noise 802-1, 802-2. In particular, as depicted, the controller 600 determines that, at a future time, the electrical characteristics (e.g. frequency and frequency bandwidth, as well as increasing in amplitude and DC offset) of the noise 802-2 will change to the noise 806. The estimated noise 806 is depicted in broken lines to indicate that the estimated noise 806 is estimated.

As depicted, it is understood that the estimated noise 806 overlaps in frequency with the data indication 800 and further has a higher amplitude and DC offset than the data indication 800. Hence, unless one or more electrical characteristics of the data indication 800 are changed, the estimated noise 806 may cause interference with the data indication 800 at a future time when the noise 802-2 changes to the noise 806.

As such, as described with respect to FIG. 9, the controller 600 may cause one or more electrical characteristics of the data indication 800 to change (e.g. at the block 706 of the method 700) to avoid interference of the estimated noise 806. For example, FIG. 9 is understood be at a time at which the estimated noise 806 has changed to the estimated electrical characteristics depicted in FIG. 8, and hence is depicted in solid lines. However, the controller 600 has moved the data indication 800 to a new frequency range that is different from, and as depicted lower than, the frequency range of the estimated noise 806; indeed, the new frequency range is further different from the respective frequency ranges of the noise 802-1, 802-2. The data indication 800 has not otherwise changed in bandwidth, amplitude or DC offset.

Alternatively, the controller 600 may cause the data indication 800 to change (e.g. at the block 706 of the method 700) to a data indication 900 depicted in FIG. 9, which is at a similar frequency range as the data indication 800 depicted in FIG. 8, but at a wider bandwidth, higher amplitude and DC offset to achieve an SNR with the estimated noise 806 that is greater than a threshold SNR. As such, the data indication 900 is understood to comprise the data indication 800 as depicted in FIG. 9, but with an increased bandwidth, an increased amplitude and an increased DC offset. However, as the data indication 900 may consumer more power than the data indication 800 depicted in FIG. 9, the controller 600 may not use the data indication 900; as such, the data indication 900 is depicted in dashed lines to represent that the data indication 900 represents a higher power example of the data indication 800, which may not be used as the data indication 800, depicted at the lower frequency range in FIG. 9, uses less power. Indeed, such an example illustrates that the controller 600 may be configured to cause the data indication 800 to change to a new electrical characteristic that minimizes power usage at the vehicle 100.

Furthermore, as also depicted in FIG. 9, the controller 600 may optionally attempt to at least partially cancel the noise 806 by providing, on the power line 608, a noise cancelling signal 902. For example, the controller 600 may generate noise cancellation datasets, for example during, and/or after, frequency scanning of the power line 608, and such noise cancellation datasets may be used to generate noise cancelling signal 902 and/or any other suitable noise cancelling signal. Furthermore, determination of noise and a noise cancelling signal may occur using Fourier Transforms, Fast Fourier Transforms (FFTs), and the like.

Hence, provided herein is an electric vehicle noise sniffer and methods of mitigating packet flow interruptions by (optionally) noise cancellation, and avoidance of noise region envelopes in which electrical characteristics of packets (e.g. data indications) are changed to avoid and/or reduce and/or minimize interference by noise on a power line.

However, yet further features are within the scope of the present specification.

For example, referring back to FIG. 1 and FIG. 3, the VIM 7 and/or the VCM 28 may be configured to enable the Power Line Bus Termination Module 35 according to operator defined and/or software selectable options, which may be based on changing noise profiles. For example, such options may include, but are not limited to:

- Turning on and off changes to data indications and/or packets (e.g. an On/Off option)
- Turning on and off frequency space changes to data indications and/or packets (e.g. an On/Off option)
- Turning on and off amplitude space changes to data indications and/or packets (e.g. an On/Off option)
- Turning on and off DC Offset space changes to data indications and/or packets (e.g. an On/Off option)
- Turning on and off noise cancellation (e.g. an On/Off option)
- Turning on and off changes to data indications and/or packets based on a percentile of data indications and/or packets that are predicted to be lost based on noise estimations; in this example the controller 600 may be configured to determine and/or estimate a percentage of data indications and/or packets that may be lost due to noise on the power line 608. When the estimated percentage is above a threshold percentage, changes to data indications and/or features may be turned on (e.g. the method 700 may be implemented). The threshold percentage may be a percentage above which the vehicle 100 is heuristically determined to at least partially fail and/or not respond quickly enough to operator inputs.
- Turning on and off noise cancellation (e.g. an On/Off option)

Indeed, turning on or off aspects of the method 700 and/or noise cancellation may be performed to minimize data processing and power usage at the vehicle 100.

As should be apparent from this detailed description above, the operations and functions of computing devices, and the like, described herein are sufficiently complex as to require their implementation on a computer system, and cannot be performed, as a practical matter, in the human mind. Computing devices, and the like, such as set forth herein are understood as requiring and providing speed and accuracy and complexity management that are not obtainable by human mental steps, in addition to the inherently digital nature of such operations (e.g., a human mind cannot interface directly with electronic components, such as a random access memory, or other digital storage, cannot transmit or receive electronic packets and/or information, cannot monitor noise on a power line, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more embodiments. The scope, therefore, is only to be limited by the claims appended hereto.

What is claimed is:

1. A vehicle comprising:
   one or more electrical components configured to operate according to data indications;
   a power line configured to convey both the data indications and power to the one or more electrical components; and
   a controller configured to:
   determine an electrical characteristic of the data indications on the power line;
   perform a plurality of determinations of present electrical characteristics of a noise signal, as the noise signal changes over time;
   compare the present electrical characteristics of the noise signal as they change over time to identify a pattern of change of the present electrical characteristics as the noise signal changes over time;
use the pattern of change of the noise signal to estimate a future electrical characteristic at a given future time; and
cause the data indications to change to a new electrical characteristic that is different from a present electrical characteristic of the noise signal on the power line and the future electrical characteristic of the noise signal on the power line to avoid interference of the noise signal with the data indications as the noise signal changes over time,
wherein electrical characteristics are one or more of in frequency space, amplitude space and direct current (DC) offset space.

2. The vehicle of claim 1, wherein the controller is further configured to:
determine that one or more respective electrical characteristics of the noise signal is due to one or more of the one or more electrical components being actuated; and
when the one or more electrical components are later actuated, cause the data indications to change to the new electrical characteristic to avoid interference of the noise signal with the data indications that is due to the one or more of the one or more electrical components being actuated.

3. The vehicle of claim 1, wherein the controller is further configured to:
cancel the noise signal on the power line.

4. The vehicle of claim 1, wherein the controller is further configured to determine the present electrical characteristics of the noise signal on the power line by one or more of:
frequency scanning over a given frequency domain on the power line;
determining an amplitude of the noise signal on the power line; and
determining a DC offset of the noise signal on the power line.

5. The vehicle of claim 1, wherein the controller is further configured to cause the data indications to change to the new electrical characteristic by one or more of:
controlling the data indications to change to one or more of a given frequency, a given bandwidth, a given amplitude, and a given DC offset that one or more of:
avoids one or more of a present frequency of the noise signal or a future estimated frequency of the noise signal; and achieves a given signal-to-noise ratio (SNR) and
communicating one or more of the given frequency, the given bandwidth, the given amplitude, and the given DC offset to the one or more other components to cause the one or more other components to one or more of transmit and receive the data indications at one or more of the given frequency, the given bandwidth, the given amplitude, and the given DC offset.

6. The vehicle of claim 1, wherein the controller is further configured to estimate the future electrical characteristic of the noise signal on the power line using one or more machine learning algorithms.

7. The vehicle of claim 1, wherein the controller is further configured to train one or more machine learning algorithms to estimate the future electrical characteristic of the noise signal on the power line.

8. The vehicle of claim 1, wherein the controller is further configured to share one or more indications of the future electrical characteristic of the noise signal on the power line with other vehicles.

9. The vehicle of claim 1, wherein the one or more one or more electrical components comprise one or more of a power conversion components, a motor and a communication unit.

10. A method comprising:
at a vehicle comprising one or more electrical components configured to operate according to data indications and a power line configured to convey both the data indications and power to the one or more electrical components, determining, at the vehicle, an electrical characteristic of the data indications on the power line;
performing a plurality of determinations of present electrical characteristics of a noise signal, as the noise signal changes over time;
comparing the present electrical characteristics of the noise signal as they change over time to identify a pattern of change of the present electrical characteristics as the noise signal changes over time;
using the pattern of change of the noise signal to estimate a future electrical characteristic at a given future time; and
causing, at the vehicle, the data indications to change to a new electrical characteristic that is different from the present electrical characteristic of the noise signal on the power line and the future electrical characteristic of the noise signal on the power line to avoid interference of the noise signal with the data indications as the noise signal changes over time, wherein electrical characteristics are one or more of in frequency space, amplitude space and direct current (DC) offset space.

11. The method of claim 10, further comprising:
determining that one or more respective electrical characteristics of the noise signal is due to one or more of the one or more electrical components being actuated; and
when the one or more electrical components are later actuated, causing the data indications to change to the new electrical characteristic to avoid interference of the noise signal with the data indications that is due to the one or more of the one or more electrical components being actuated.

12. The method of claim 10, further comprising:
canceling the noise signal on the power line.

13. The method of claim 10, further comprising determining the present electrical characteristics of the noise signal on the power line by one or more of:
frequency scanning over a given frequency domain on the power line;
determining an amplitude of the noise signal on the power line; and
determining a DC offset of the noise signal on the power line.

14. The method of claim 10, further comprising causing the data indications to change to the new electrical characteristic by one or more of:
controlling the data indications to change to one or more of a given frequency, a given bandwidth, a given amplitude, and a given DC offset that one or more of:
avoids one or more of a present frequency of the noise signal or a future estimated frequency of the noise signal; and achieves a given signal-to-noise ratio (SNR) and
communicating one or more of the given frequency, the given bandwidth, the given amplitude, and the given DC offset to the one or more other components to cause the one or more other components to one or more of transmit and receive the data indications at one or more of the given frequency, the given bandwidth, the given amplitude, and the given DC offset.

15. The method of claim 10, further comprising estimating the future electrical characteristic of the noise signal on the power line using one or more machine learning algorithms.

16. The method of claim 10, further comprising training one or more machine learning algorithms to estimate the future electrical characteristic of the noise signal on the power line.

17. The method of claim 10, further comprising sharing one or more indications of the future electrical characteristic of the noise signal on the power line with other vehicles.

18. The method of claim 10, wherein the one or more one or more electrical components comprise one or more of a power conversion components, a motor and a communication unit.

* * * * *